US012764523B2

(12) United States Patent
Chuang et al.

(10) Patent No.: US 12,764,523 B2
(45) Date of Patent: Oct. 13, 2026

(54) USIM-CALCULATED CONCEALED IDENTIFIER FAILURE HANDLING

(71) Applicant: GOOGLE LLC, Mountain View, CA (US)

(72) Inventors: Po-Ying Chuang, Taipei (TW); Huang-Da Chen, Taipei (TW); Hsin-Liang Lin, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 203 days.

(21) Appl. No.: 18/019,947

(22) PCT Filed: Aug. 6, 2021

(86) PCT No.: PCT/US2021/044961

§ 371 (c)(1),
(2) Date: Feb. 6, 2023

(87) PCT Pub. No.: WO2022/035696

PCT Pub. Date: Feb. 17, 2022

(65) Prior Publication Data

US 2023/0292109 A1 Sep. 14, 2023

Related U.S. Application Data

(60) Provisional application No. 63/064,013, filed on Aug. 11, 2020.

(51) Int. Cl.
*H04W 12/02* (2009.01)
*H04W 12/06* (2021.01)
*H04W 12/72* (2021.01)

(52) U.S. Cl.
CPC .......... *H04W 12/02* (2013.01); *H04W 12/06* (2013.01); *H04W 12/72* (2021.01)

(58) Field of Classification Search
CPC ...... H04W 12/02; H04W 12/06; H04W 12/72
See application file for complete search history.

(56) References Cited

U.S. PATENT DOCUMENTS

2019/0098502 A1* 3/2019 Torvinen .......... H04W 12/0433
2019/0246267 A1* 8/2019 Nakarmi .............. H04W 8/183
(Continued)

FOREIGN PATENT DOCUMENTS

WO 2020116915 A1 6/2020

OTHER PUBLICATIONS

International Preliminary Report on Patentability mailed Feb. 23, 2023 for PCT Application No. PCT/US2021/044961, 9 pages.
(Continued)

*Primary Examiner* — Chau Le

(57) ABSTRACT

In a mobile cellular network, a mobile network operator (MNO) or other entity can specify whether a user equipment (UE) is to utilize either a concealed identifier (e.g., a subscription concealed identifier (SUCI)) calculated by a universal subscriber identity module (USIM) of a universal integrated circuit card (UICC) or a concealed identifier calculated by mobile equipment (ME) of the UE that is separate from the UICC and USIM. In the event that a USIM-calculated concealed identifier is specified for use but the USIM fails in generation of a concealed identifier, the UE can utilize one or more failure recovery procedures to attempt completion of attachment of the UE to the same network or a different network to help ensure that the UE does not remain attached to a network without access to services of the network due to authentication failure.

20 Claims, 5 Drawing Sheets

(56) References Cited

U.S. PATENT DOCUMENTS

| | | | | |
|---|---|---|---|---|
| 2020/0329520 | A1* | 10/2020 | Jayavarapu | H04W 48/18 |
| 2021/0176628 | A1* | 6/2021 | Chikkala | H04W 12/06 |
| 2021/0345284 | A1* | 11/2021 | Gudivada | H04W 8/205 |
| 2021/0368345 | A1* | 11/2021 | Nakarmi | H04L 9/0825 |
| 2022/0038911 | A1* | 2/2022 | Verma | H04W 12/06 |

OTHER PUBLICATIONS

International Search Report and Written Opinion mailed Nov. 17, 2021 for corresponding PCT Application No. PCT/US2021/044961, 14 pages.

3GPP TS 23.003 version 15.8.0 Release 15, "Digital cellular telecommunications system (Phase 2+) (GSM); Universal Mobile Telecommunications System (Umts); LTE; Numbering, addressing and identification", Technical Specification; ETSI TS 102 003 v 15.8.0; Sep. 2019; 133 pages.

3GPP TS 23.501 version 15.8.0 Release 15, "5G; System architecture for the 5G System (5GS)", Technical Specification; ETSI TS 123 501 v 15.8.0; Jan. 2020; 251 pages.

3GPP TS 24.501 version 15.6.0 Release 15, "5G; Non-Access Stratum (NAS) protocpol for 5G System (5GS); Stage 3", Technical Specification; ETSI TS 124 501 v 15.6.0 Jan. 2020, 491 pages.

3GPP TS 31.102 version 16.4.0 Release 16, "3rd Generation Partnership Project; Technical Specification Group Core Network and Terminals; Characteristics of the Universal Subscriber Identity Module (USIM) Application", Technical Specification; Jun. 2020; 328 pages.

3GPP TS 31.131 version 15.1.0 Release 15, "Universal Mobile Telecommunications System (UMTS); LTE; Characteristics of the Universal Subscriber Identity Module (USIM) Application", Technical Specification; ETSI TS 131 102 v 15.1.0; Jul. 2018; 309 pages.

3GPP TS 33.501 version 15.2.0 Release 15, "5g; Security Architecture and Procedures for 5G System", Technical Specification; ETSI TS 133 501 v 15.2.0; Oct. 2018; 172 pages.

Qualcomm Inc., "Evaluation of Solutions for Routing ID Update", 3GPP TSG CT WG1 Meeting #112bis; Vilnius, Lithuania; Oct. 15-19, 2018; 5 pages.

* cited by examiner

USIM-CALCULATED CONCEALED IDENTIFIER FAILURE HANDLING

CROSS-REFERENCE TO RELATED APPLICATIONS

The present application is a U.S. National Stage under 35 U.S.C. § 371 of International Patent Application Serial No. PCT/US2021/044961, entitled "USIM-CALCULATED CONCEALED IDENTIFIER FAILURE HANDLING" and filed on Aug. 6, 2021, which claims priority to U.S. Provisional Application No. 63/064,013, entitled "5G SUCI GET IDENTITY FAILURE HANDLING" and filed on Aug. 11, 2020, the entireties of which are incorporated by reference herein.

BACKGROUND

In a typical cellular system, when a user equipment (UE) first attaches to a network, the UE provides a unique identifier associated with the UE to authenticate the UE to the network, with this unique identifier typically stored at the UE in association with a subscriber identity module (SIM) of the UE. In the Third Generation Partnership Project (3GPP) Fourth Generation (4G) standards, the international mobile subscriber identity (IMSI) of the UE is utilized as this unique identifier. However, to enhance the overall system security, in the 3GPP Fifth Generation New Radio (5G NR) standards the UE instead stores and provides a newly-defined mobile identity, referred to as a Subscription Concealment Identifier (SUCI), to the network for authentication. The SUCI is a privacy-preserving identifier containing an encrypted or otherwise protected Subscription Permanent Identifier (SUPI) that is globally unique to the UE and may contain an IMSI or a network-specific access identifier (NAI). Typically, a SUPI in the IMSI format is composed of a combination of a Mobile Country Code (MCC), a Mobile Network Code (MNC), and a Mobile Subscriber Identification Number (MSIN) associated with the UE. The format of the SUCI, in turn, includes fields indicating the SUPI type, the home network identifier type, a routing indicator, and an identifier of the particular protection scheme used to encrypt or otherwise conceal the SUPI, a home network public key identifier, and a protection scheme output.

There are two approaches to obtaining the SUCI for a UE, and it typically is left to the network operator as to which approach is implemented: in the first approach, the USIM (Universal Subscriber Identity Module) implemented in a universal integrated circuit card (UICC) of the UE calculates the SUCI, while in the second approach a mobile equipment (ME) component of the UE calculates the SUCI (where the ME is understood to be the components of the UE that are separate from the USIM/UICC, and thus may refer to the entirety of the UE in some cases. In the first approach, a software layer (e.g., modem) of the UE issues a GET IDENTITY command to the USIM, which in response outputs the SUCI, which can then be forwarded by the UE to the network for authentication. For the second approach, the USIM stores an ordered priority list of the protection schemes that the network operator has provisioned for the USIM (that is, an ordered list of protection scheme identifiers that the network operator has allowed to be used). Accordingly, to calculate the SUCI, a software layer of the UE reads SUCI calculation information from the USIM (and which includes this ordered priority list) via the $EF_{SUCI\_Calc\_Info}$ reading procedure. The UE then selects the highest priority protection scheme from this ordered priority list that is also supported by the UE, and then encodes or otherwise protects the SUPI using this selected protection scheme and other SUCI calculation information obtained from the USIM to generate the SUCI, which is then forwarded to the network for authentication. In the event that one or both of the home network public key or the ordered priority list is not provisioned in the USIM, the UE defaults to using a specified null protection scheme.

SUMMARY OF EMBODIMENTS

In accordance with one aspect, a method in a user equipment (UE), the method includes: responsive to a universal subscriber identity module (USIM) of the UE failing to generate a USIM-calculated concealed identifier for the UE during an attach procedure to wirelessly connect the UE to a first network, implementing at least one failure recovery process to attempt to complete attachment of the UE to a network. Embodiments of this method include the following aspects, individually in various combinations.

The concealed identifier can include a subscription concealed identifier (SUCI). The at least one failure recovery process includes a process of: accessing concealed identifier calculation information from the USIM; calculating at least one concealed identifier using the concealed identifier calculation information and without using the USIM; and providing the at least one concealed identifier for receipt by the first network for authentication of the UE. In some instances, the concealed identifier calculation information comprises an ordered priority list of protection schemes available for use in calculating a concealed identifier from a unique identifier associated with the UE and a home network public key list of home network public keys associated with respective protection schemes of the ordered priority list; and calculating at least one concealed identifier and providing the at least one concealed identifier to the first network comprises: selecting a protection scheme from the ordered priority list that has not yet been selected and which is supported by the UE; calculating a concealed identifier using the selected protection scheme and a corresponding home network public key; and providing the calculated concealed identifier for receipt by the first network for authentication. Calculating at least one concealed identifier and providing the at least one concealed identifier to the first network further can include: repeating the selection of a protection scheme from the ordered priority list that has not yet been selected and which is supported by the UE, the calculation of a concealed identifier using the selected protection scheme, and the provision of the calculated concealed identifier to the first network for authentication until one of: a provided calculated concealed identifier is authenticated by the first network or every protection scheme of the ordered priority list that is supported by the UE has been selected and used for calculation of a corresponding concealed identifier. The method thus can further include: responsive to every protection scheme of the ordered priority list that is supported by the UE having been selected and used for calculation of a corresponding concealed identifier without being authenticated by the network, implementing a different failure recovery process to attempt to complete attachment of the UE to a network. The different failure recovery process can include a process of: disabling a first radio access technology (RAT) of the UE used to communicate with the first network; and switching to a second RAT of the UE to attempt to attach to a second network. The first RAT can include a Fifth Generation New Radio (5G NR) RAT and the second RAT can include a Fourth Generation Long Term Evolution (LTE) RAT. The at least one failure recovery process can include a process of: disabling a radio access technology (RAT) of the UE used to communicate with the first network; monitoring for at least one trigger event; and responsive to detecting a trigger event: enabling the RAT; and attempting to obtain a USIM-calculated concealed identifier from the USIM for another attempt to complete attachment of the UE to the first network.

The at least one failure recovery process can include a process of: disabling a radio access technology (RAT) of the UE used to communicate with the first network; monitoring for at least one trigger event; and responsive to detecting a trigger event: enabling the RAT; and attempting to obtain a USIM-calculated concealed identifier from the USIM for another attempt to complete attachment of the UE to the first network. The at least one trigger event can include expiry of a timer, an over-the-air (OTA) update of the USIM, or a reset of the USIM.

In accordance with another aspect, a non-transitory computer-readable storage medium stores instructions, that when executed by at least one processor, manipulate the at least one processor to perform the method above.

In accordance with yet another aspect, a user equipment includes a radio frequency (RF) interface configured to communicate with at least a first network, a universal integrated circuit card (UICC) implementing a universal subscriber identity module (USIM), at least one processor coupled to the RF interface and the UICC, and at least one memory coupled to the at least one processor. The at least one memory stores instructions configured to manipulate the at least one processor to perform the method above.

Figure 1:
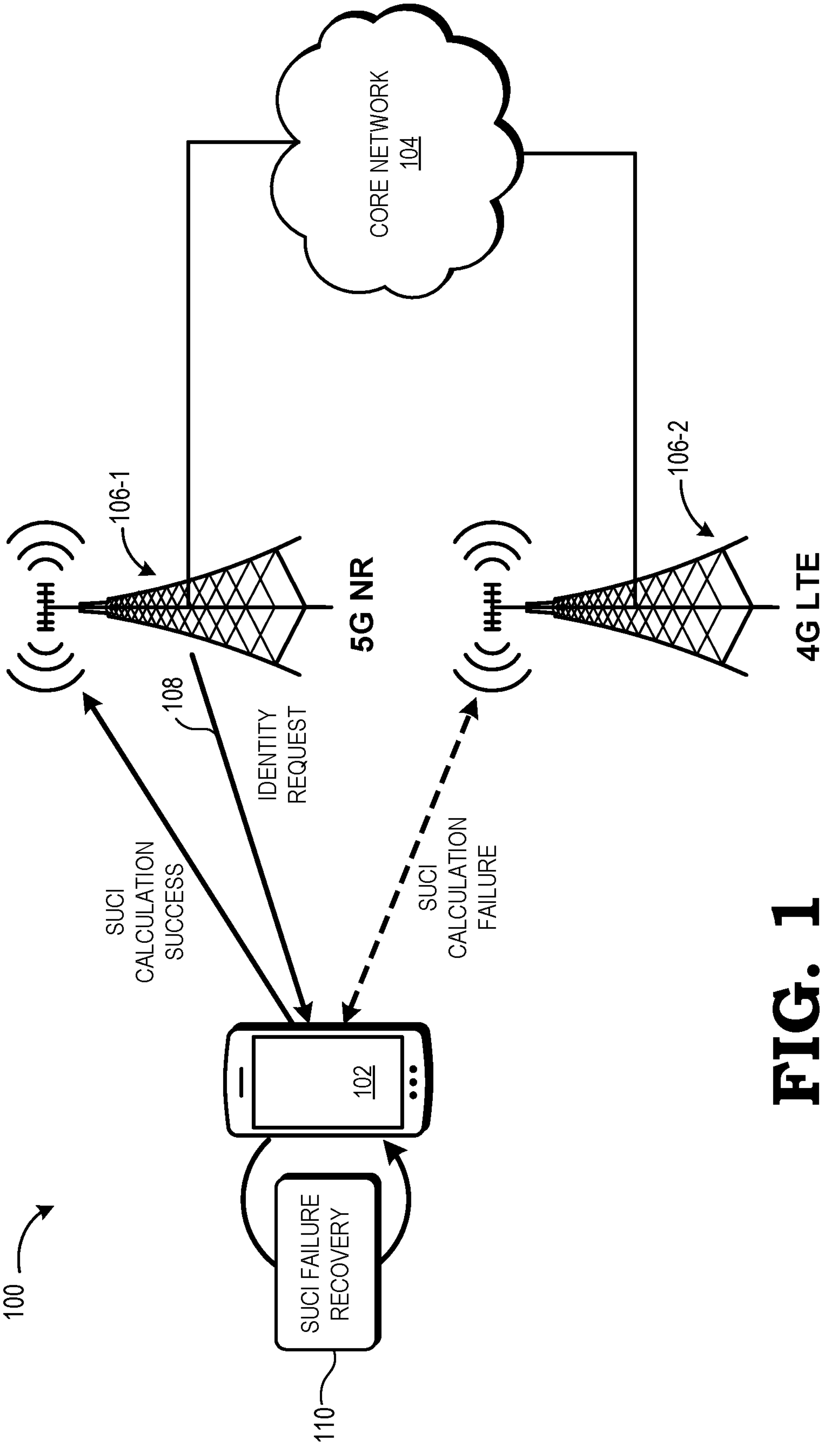
FIG. 1 is a block diagram illustrating a cellular system with a UE that employs a SUCI failure recovery process in accordance with some embodiments.

In 5G NR systems and similar systems, a UE initiates attachment to a 5G NR network or a similar network via a corresponding base station (that is, a gNodeB or "gNB") and prepares to provide a SUCI to the base station for authentication by the associated 5G NR network. The process of calculating the SUCI for authentication can be performed by the USIM of a UE (that is, "USIM-calculated") or by one or more components of the UE separate from the USIM or UICC implementing the USIM (that is, "ME-calculated"). When a network operator specifies a USIM-calculated approach for SUCI, the UE issues a GET IDENTITY command to the USIM to trigger the USIM to calculate and provide the SUCI. However, in some circumstances, the USIM may not be able to correctly calculate the SUCI or otherwise may encounter an issue in providing the SUCI, and thus return an error instead of a calculated SUCI to the UE. In this event, the UE would be attached to the 5G NR network but would not be able to authenticate itself to the 5G NR network and thus unable to access some or all of the services provided by the 5G NR network. As such, the UE could be stuck in a 5G NR mode but with limited or even no 5G NR service.

To mitigate the potential for an incomplete attachment to a 5G NR network due to a USIM-calculated SUCI GET IDENTITY error or other failure in the process of SUCI provision by the USIM, the following describes systems and techniques for USIM SUCI failure recovery that avoid incomplete network attachment. In at least one embodiment, in association with initiating the attach process to attach to a 5G NR network or similar network employing SUCI or a similar concealed identifier, the UE determines whether the SUCI is to be calculated by the USIM ("USIM-calculated") or to be calculated by an ME portion of the UE separate from the USIM ("ME-calculated"). In the event that the SUCI is to be ME-calculated, the ME portion obtains the appropriate SUCI calculation information from the USIM, calculates the SUCI, and provides this SUCI to the network as part of the authentication component of the attach process. In the event that the SUCI is to be USIM-calculated, the UE issues a GET IDENTITY command to the USIM to obtain the calculated SUCI from the USIM. Assuming the USIM correctly returns the calculated SUCI, the UE can then supply this SUCI to the network for authentication purposes.

However, in some instances, the USIM may be unable to correctly provide an accurate SUCI to the UE. For example, the USIM may not have been provisioned with a parameter necessary for the USIM to calculate the correct SUCI, the MNO may have provided an incorrect carrier configuration, the SIM hardware or modem driver may be subject to an operational error, a SIM over-the-air (OTA) update may have failed, and the like. In such instances, the USIM returns an error code in response to the GET IDENTITY command. In at least one embodiment, the UE is configured to employ one or a sequence of USIM SUCI failure recovery processes in response to a GET IDENTITY failure or other error in the USIM-calculated SUCI provisioning process.

One such SUCI failure recovery process includes the disabling of the 5G NR radio access technology (RAT) at the UE and the fallback to using a legacy RAT, such as a 4G LTE, to establish a network connection. Another example of a SUCI failure recovery technique involves falling back to a ME-calculated SUCI failure recovery process in which the UE can access SUCI calculation information (or other concealed identifier calculation information) from the USIM and then cycle through some or all of the available SUCI protection schemes and generate a corresponding ME-calculated SUCI until a ME-calculated SUCI is accepted by the network or the UE has attempted all available SUCI protection schemes. As yet another example of a SUCI failure recovery process, the UE can disable the 5G NR RAT and then wait for a trigger event, which then causes the UE to re-enable the 5G NR RAT and re-attempt the attach process. This trigger event can include, for example, a lapse of a timer, an over-the-air (OTA) update of the SIM or USIM of the UE, a reset of the SIM or USIM of the UE, or a combination thereof.

For ease of illustration, the systems and techniques of the present disclosure are described in the example context of cellular network employing a 5G NR network as the preferred network for attachment for a UE. As such, the following description describes the systems and techniques using the parlance of the 5G NR standards. However, it will be appreciated that the systems and techniques are not limited to this example context, but instead may be employed in any of a variety of current or future cellular networks that implement an identity protection scheme in which a secure component of the UE may be utilized to provide an encrypted or otherwise concealed version of a unique identifier of the UE for use in authentication of the UE. For example, unless otherwise noted, it will be understood that reference to USIM may also be a reference to any software-based or hardware-based cellular information security module that may be provisioned for a UE, reference to SUCI may also be a reference to any encrypted/concealed version of a unique identifier for the UE that may be provided by such cellular information security module, reference to the GET IDENTITY command may also be a reference to any command, request, or other technique to obtain the encrypted/protected version of the unique identifier for the UE from such cellular information security module, and so forth.

FIG. 1 illustrates an example cellular system 100 employing USIM-calculated SUCI failure recovery in accordance with some embodiments. The system 100 includes one or more UEs 102 that can be wirelessly connected to one or more core networks 104 via one or more base stations 106 using corresponding RATs. A UE 102 can include any of a variety of cellular-enabled devices, including cellular phones, cellular-enabled tablet computers, cellular-enabled laptop computers, mobile hotspots, vehicular entertainment systems, and the like. In the illustrated example, the base station 106-1 is part of a 5G NR radio access network (RAN) and thus enables wireless connections with UEs 102 via a 5G NR RAT (in this example considered to be the "preferred" RAT), whereas the base station 106-2 is part of a 4G LTE RAN and thus enables wireless connections with UEs 102 via a 4G LTE RAT (which in this example is considered to be the "legacy" or "non-preferred" RAT).

As the 5G NR RAN is the "preferred" RAN in this example, the UE 102 seeks to attach to the 5G NR RAN when available and will fall back to a wireless connection with the 4G LTE RAN when the 5G NR RAN is unavailable or when the UE 102 is unable to attach to the 5G NR RAN. In implementations where the connection mode is a standalone (SA) mode in which control signaling is routed through the 5G NR RAN to a 5G NR core network 104, the UE 102 initiates a connection with the 5G NR network via an attach procedure (also known as "registration") in which the UE 102 and the base station 106-1 (also known as a "gNodeB" or "gNB") coordinate in a sequence of transmissions to establish uplink (UL) and downlink (DL) synchronization, contention resolution, registration request, Non-Access Stratum (NAS) security procedures, and the like. In the event that it is the first time the UE 102 seeks to attach to 5G NR network, the UE 102 calculates a SUCI and provides the calculated SUCI as part of the 5G NR registration request. In the event that the UE 102 is seeking to re-attach to a 5G NR network previously encountered, or otherwise has a temporary identity (e.g., converted from a 4G LTE Globally Unique Temporary Identifier (GUTI), the UE 102 can use the temporary identity as part of the 5G NR registration request, and then a 5G NR core network 104 performs a NAS identity transfer procedure 108 in which an Access and Mobility Management Function (AMF) or Security Anchor Function (SEAF) of the core network 104 sends an identity request to the UE 102 via the base station 106-1, and the UE 102 responds with a SUCI (or other concealed identifier) that is an encrypted or otherwise protected version of a globally unique identifier, such as a SUPI, assigned to the UE 102. In either situation, an Authentication Server Function (ASF) and/or a Subscription Identifier De-concealing Function (SIDF) of the home network of the UE 102 then decrypts the SUCI to obtain the SUPI represented therein to authenticate the identity of the UE 102. If successfully authenticated, the remainder of the attach procedure may proceed to establish a wireless connection between the UE 102 and the base station 102-1 and provide access to the services provided by the 5G NR core network 104.

Typically, the UE 102 can obtain the SUCI for provision to the 5G NR core network 104 in response to the identity request either via accessing a USIM-calculated SUCI or by calculating the SUCI directly as a ME-calculated SUCI (that is, without using the USIM during the calculation process), depending on the particular configuration selected and employed by the mobile network operator (MNO). The calculation of the SUCI is relatively complicated and relies on the MNO to provision various parameters used for the SUCI encryption process, including protection scheme parameters and a home network public key. In the event that one or more of these parameters is not provisioned or is corrupted in the USIM, the USIM will be unable to correctly calculate the SUCI should the MNO have elected to utilize a USIM-calculated SUCI for authentication purposes. Conventionally, failure in generating a correct USIM-calculated SUCI results in authentication failure, but without a corresponding specified technique to detach from the 5G NR RAN, and thus leading to the UE continuing to be attached to the 5G NR RAN but unable to access the services from the 5G NR core network due to failed authentication.

To reduce the impact of this situation, in at least one embodiment the UE 102 employs a SUCI failure recovery scheme 110 that uses one or a sequence of recovery processes to recover from a failure to obtain a USIM-calculated SUCI in a manner that prevents the UE 102 from remaining attached to a 5G NR network without access to 5G NR services. Such techniques can include forcing a fallback to using a legacy RAT/RAN instead, such as falling back to establishing a connection to the 4G LTE RAN via the base station 106-2 in the event of a USIM-calculated SUCI failure, attempting to replace the USIM-calculated SUCI with one or more attempts at ME-calculated SUCIs generated using different protection schemes, or by re-attempting the attach procedure using the USIM-calculated SUCI in response to one or more trigger events. These techniques are described in greater detail below with reference to FIGS. 3-5.

Figure 2:
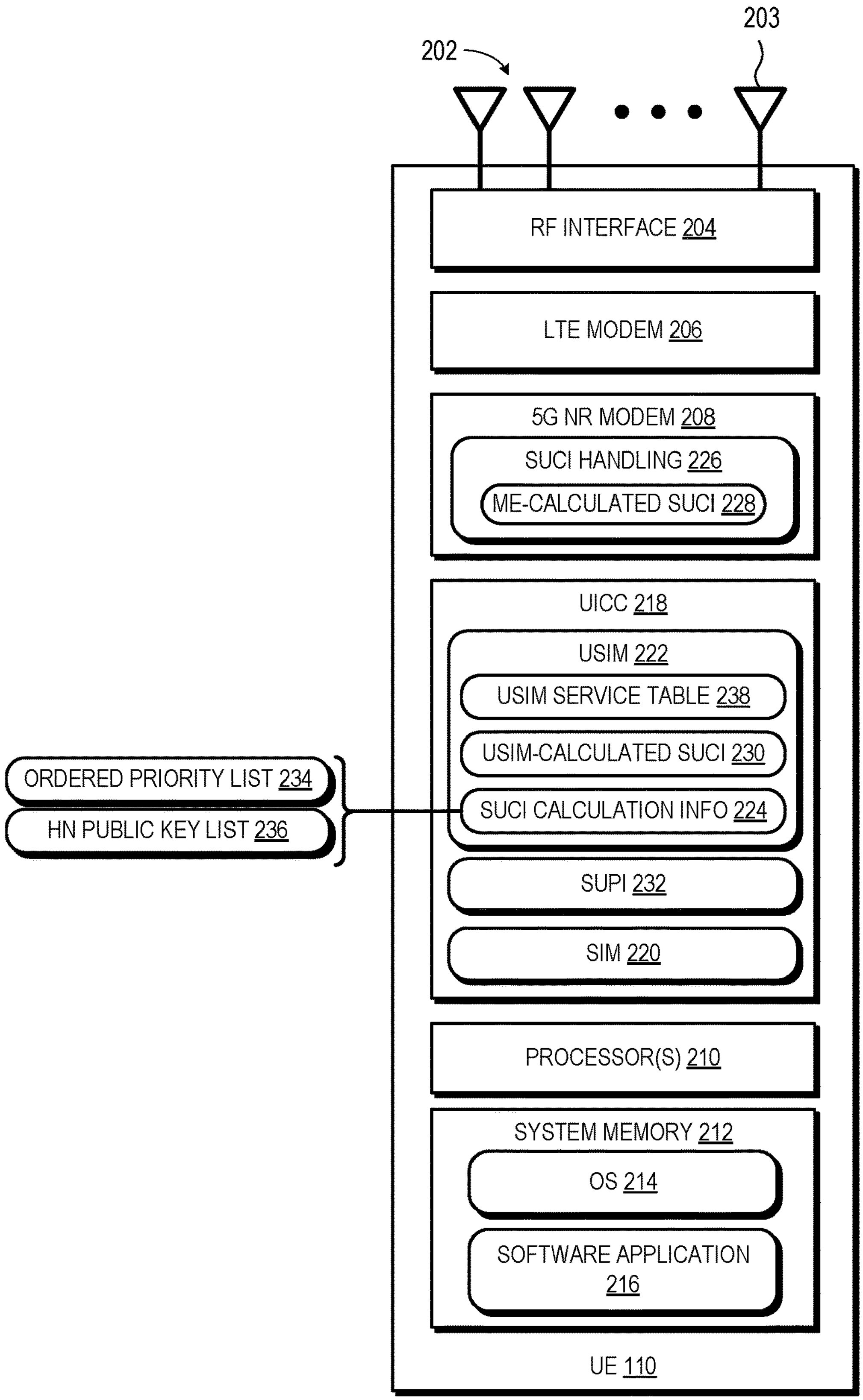
FIG. 2 is a block diagram illustrating an example hardware and software configuration of the UE of FIG. 1 in accordance with some embodiments.

FIG. 2 illustrates an example hardware and software configuration for the UE 102 in accordance with some embodiments. Note that the depicted configuration represents the processing components and communication components most directly related to the attach procedure and SUCI failure recovery processes described herein and omits certain components well-understood to be frequently implemented in such electronic devices, such as displays, user input/output (I/O) devices, power supplies, and the like.

In the depicted configuration, the UE 102 includes an array 202 of one or more antennas 203, a radio frequency (RF) interface 204, and one or more wireless modems implementing corresponding cellular protocols for conducting RF-based communications with a base station 106 in accordance with a corresponding radio access technology (RAT), such as an LTE modem 206 and a 5G NR modem 208. The RF interface 204 operates to conduct signals between the modems 206, 208 and the array 202 to facilitate various types of wireless communication. The antennas 203 can include an array of multiple antennas that are configured similar to or different from each other and can be tuned to one or more frequency bands associated with the corresponding RAT.

The UE 102 further includes one or more processors 210 and at least one system memory 212 (or other non-transitory computer-readable media). The one or more processors 210 can include, for example, one or more central processing units (CPUs), graphics processing units (GPUs), application-specific integrated circuits (ASICs), and the like. To illustrate, the processors 210 can include an application processor (AP) utilized by the UE 102 to execute an operating system and various user-level software applications, as well as one or more processors utilized by the modems 206, 208. The system memory 212 can include any of a variety of media used by electronic devices to store data and/or executable instructions, such as random-access memory (RAM), read-only memory (ROM), caches, Flash memory, solid-state drive (SSD) or other mass-storage devices, and the like. The one or more system memories 212 of the UE 102 are used to store one or more sets of executable software instructions and associated data that manipulate the one or more processors 210 and other components of the UE 102 to perform some or all of the various functions described herein and attributed to the UE 102. The sets of executable software instructions include, for example, an operating system (OS) 214 and various drivers (not shown) and various user-level software applications 216.

The UE 102, in some embodiments, further includes a universal integrated circuit card (UICC) 218 (e.g., a SIM "card") that incorporates its own processor and memory (not shown) to store and execute various software applications separate from the processors 210 and memory 212 of the UE 102 (that is, separate from the ME components of the UE 102). Note that for purposes of the following description, reference to UICC can include reference to simulated or virtual SIM "cards" that are simulated in software, such as by the operating system or via a server-based application. Examples include iUICC, SoftSIM, and VirtualSIM. The software applications provisioned with the UICC 218 include a SIM 220 to facilitate connection and operation with, for example, a Global System for Mobile Communications (GSM) network or a Code Division Multiple Access (CDMA) network, as well as a USIM 222 to facilitate connection with Universal Mobile Telecommunications System (UMTS) networks, 4G LTE networks, and 5G NR networks. The USIM 222 operates to identify the UE 102 to a network, and in particular, to either or both of provide SUCI calculation information 224 for use by a SUCI handling module 226 of the ME componentry of the UE 102 in generating a ME-calculated SUCI 228 or use these same SUCI calculation information 224 to calculate the SUCI and provide the calculated SUCI to the ME portion of the UE 102 as a USIM-calculated SUCI 230.

The SUCI calculation information 224 can include any of a variety of parameters that may be utilized to generate an encrypted or otherwise concealed version of a unique identifier (e.g., SUPI 232) associated with the UE 102. To illustrate, in the context of a 5G NR implementation, 3GPP Technical Specification (TS) 133.501 provides that the SUCI calculation information 224 is stored in an elementary file (EF), designated "EFSUCI_Calc_Info", and which contains data that represents an ordered priority list 234 and a home network (HN) public key list 236. The ordered priority list 234 represents a list of protection scheme identifiers in a designated priority order, each protection scheme identifier representing a corresponding protection scheme that may be employed to protect the SUPI 232 in generating a corresponding SUCI. Typically, the protection schemes included in the ordered priority list 234, and their ordered priority, are provisioned by the MNO. As for the protection schemes identified in the ordered priority list 234, each protection scheme represents one or more specific parameter values employed in the cryptographic function (e.g., an Elliptic Curve Integrated Encryption Scheme) used to encrypt the SUPI as part of the SUCI calculation. In the example context of 5G NR, 3GPP TS 133.501 provides for three protection scheme profiles: Null, Profile A, and Profile B. A Null protection scheme profile provides for no protection scheme; that is, the SUPI is provided as clear text without any encryption. Profiles A and B rely on use of the specific parameter values represented in a corresponding protection scheme. Further, in some embodiments, a proprietary protection scheme profile, such as one designated by the home public land mobile network (HPLMN), may also be employed.

Correspondingly, the HN public key list 236 includes a list of HN public key identifier and corresponding HN public key pairs, each HN public key identifier/public key pair corresponding to a respective protection scheme identifier in the ordered priority list 234. The HN public key associated with a corresponding protection scheme is used as part of the encryption process for the SUPI using that protection scheme, and the HN public key identifier is provided as part of the SUCI 230 to allow the home network to identify the public key employed in encrypting the SUPI so that the home network can utilize the corresponding private key in decrypting the SUPI.

As noted above, the SUCI provided by the UE 102 during the registration/attach procedure can be either a USIM-calculated SUCI or a ME-calculated SUCI, and the manner in calculating the SUCI typically is specified by the MNO or HPLMN. To illustrate, in a 5G NR implementation, the USIM 222 typically includes a USIM service table 238, implemented as an EF designated EFUST, that identifies those services that are available to the corresponding ME component of the UE 102. Two such services are particularly pertinent to the SUCI-based authentication process: service no124 ("Subscription identifier privacy support") and service no125 ("SUCI calculation by the USIM"). If both service no124 and service no125 are specified in the USIM service table 238 as available, then SUCI calculation is to be performed by the USIM (that is, a USIM-calculated SUCI is to be used), whereas if service no124 is available but service no125 is unavailable, then SUCI calculation is to be performed by the ME (that is, a ME-calculated SUCI is to be used). Accordingly, the SUCI handling module 226 or other component of the UE 102 can determine whether the SUCI to be provided for an authentication process is to be a USIM-calculated SUCI or a ME-calculated SUCI by performing a reading of the USIM service table 238 and determining the availability statuses of services no124 and no125 as outlined above.

Figure 3:
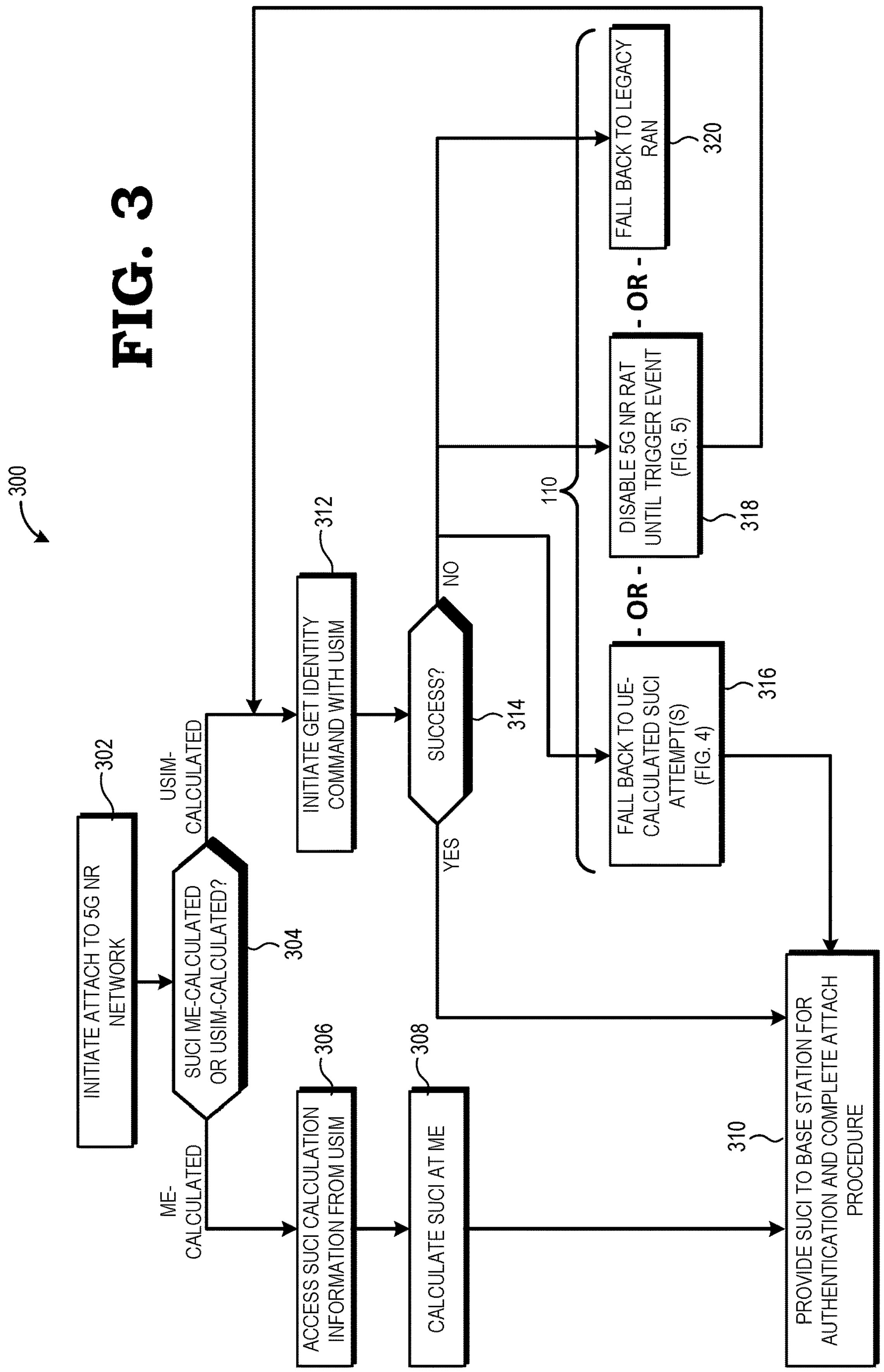
FIG. 3 is a flow diagram illustrating an example method for SUCI calculation and SUCI failure recovery in accordance with some embodiments.

FIG. 3 illustrates an example method 300 for SUCI generation and transmission during an authentication process with SUCI failure recovery in accordance with some embodiments. In the depicted example, the method 300 initiates at block 302 with the UE 102 identifying a proximate 5G NR RAN as being a suitable network for attachment and thus initiating an attach procedure (that is, registration) with the base station (e.g., base station 102-1) associated with the identified 5G NR RAN. This attach procedure typically includes UL and DL synchronization and radio resource control (RRC) setup followed by the UE 102 sending a registration request, which either may include a calculated SUCI or may trigger the core network 104 to request a calculated SUCI.

To this end, at block 304 the SUCI handling module 226 or other component of the UE 102 determines whether the SUCI to be provided for authentication is intended by the MNO or HPLMN to be a USIM-calculated SUCI or a ME-calculated SUCI. As explained above, in a 5G NR context, the UE 102 can perform an EF reading of the USIM service table 238 to determine the availability status of services no124 and no125. If both service no124 and service no125 are available, the UE 102 is to attempt to obtain a USIM-calculated SUCI for provision to the network. However, if service no124 is available but service no125 is unavailable, then the UE 102 is to attempt to calculate a ME-calculated SUCI for provision to the network.

If a ME-calculated SUCI is to be attempted, then at block 306 the UE 102 accesses the SUCI calculation information 224 from the USIM 222 by performing, for example, a reading of EFSUCI_Calc_Info. As explained above, this SUCI calculation information can include the ordered priority list 234 of protection scheme identifiers and a corresponding HN public key list 236. At block 308, the SUCI handling module 226 or other component of the UE 102 then calculates a ME-calculated SUCI using the SUPI 232 and the accessed SUCI calculation information 224. Typically, the UE 102 selects the protection scheme from the ordered priority list 234 that is highest priority protection scheme that is supported or otherwise available to the UE 102, and then encrypts the SUPI 232 using the parameters specified by the selected protection scheme, or in the event that the Null protection scheme is the selected protection scheme, the plaintext SUPI or an alternative identifier (e.g., a username) may be provided in place of an encrypted version of the SUPI 232. Regardless of whether the SUCI is USIM-calculated or ME-calculated, the calculated SUCI typically is represented by a concatenation of values from the same fields, including a SUPI type, a HN identifier, a routing indicator, an identifier of the protection scheme employed to generate the SUCI, the HN public key identifier of the HN public key used to encrypt the SUPI 232, and the scheme output, which represents the encrypted result or output of encrypting the SUPI 232 using the parameters of the selected protection scheme.

At block 310, the UE 102 wirelessly transmits the calculated SUCI to the gNB station (e.g., base station 106-1) of the associated 5G NR network in furtherance of the authentication process. In the event that the home network of the UE 102 authenticates the UE 102 via the provided SUCI, the 5G NR network then permits the UE 102 to access various services provided by the 4G LTE network.

Returning to block 304, if the UE 102 instead determines that the MNO has provisioned the UICC 218 so that the UE 102 is to attempt to provide a USIM-calculated SUCI, then at block 312 the SUCI handling module 226 or other component of the UE 102 issues a GET IDENTITY command to the USIM 222 to obtain a USIM-calculated SUCI from the USIM 222. In response to the GET IDENTITY command, the USIM 222, in some embodiments, attempts to calculate a SUCI using the SUPI 232 and the SUCI calculation information 224 provisioned by the MNO or other supplier of the UICC 218 and provide the resulting USIM-calculated SUCI 230 to the UE 102. In other embodiments, the USIM 222 may be pre-programmed with a USIM-calculated SUCI 230 or may have previously calculated the USIM-calculated SUCI 230 and has stored it for subsequent use, in which case the USIM 222 may attempt to access this stored USIM-calculated SUCI 230 for provision to the ME component of the UE 102 in response to the GET IDENTITY command. However, in either approach, the USIM 222 may not be successful in its attempt to provide a USIM-calculated SUCI. For example, the MNO or HPLMN may not have provisioned the UICC 218 with the requisite ordered priority list 234 or with the requisite HN public key list 236, in which case the USIM 222 would be unable to suitably calculate a SUCI. As another example, the data in such lists may have been corrupted or inadvertently erased in an OTA. As yet another example, the USIM service table 238 may be incorrectly configured to indicate that both service no124 and service no125 are available, but the USIM 222 may not in fact have the SUCI calculation capability. Still further, a hardware component of the USIM 222 may be malfunctioning and thus unable to implement the calculations or other operations needed to calculate the SUCI. In the event that a pre-stored USIM-calculated SUCI is to be provided, this pre-stored value may not have been provisioned or may have been subsequently corrupted or erased.

At block 314, the USIM 222 responds to the GET IDENTITY command either by providing a USIM-calculated SUCI 230 or by signaling an error in the attempt to generate a USIM-calculated SUCI 230. In the event that the calculation of a SUCI by the USIM 222 is successful, then the method 300 flows to block 310 for provision of the resulting USIM-calculated SUCI 230 to the 5G NR network for authentication purposes. However, if it is determined at block 314 that the USIM 222 has not been successful in providing a USIM-calculated SUCI, then the UE 102 is unable to provide a USIM-calculated SUCI to the network for authentication as mandated by the MNO. In a conventional approach, this could lead to the undesirable situation in which the UE 102 remains attached to the 5G NR network but is unable to access the services due to a lack of authentication (as no SUCI has been provided for authentication and thus the 5G NR network has neither detached the UE 102 nor permitted access to its services).

To mitigate or even prevent this undesirable situation, in at least one embodiment the UE 102 employs the SUCI failure recovery scheme 110 in response to the return of an error signal rather than a SUCI from the USIM 222 as determined at block 314. In the depicted example, the SUCI failure recovery scheme 110 employs at least three recovery processes, which may be attempted singularly or in some combinatorial sequence. One failure recovery process, represented by block 316, is to abandon the MNO-specified USIM-calculation attempt and fall back to one or more attempts to generate a ME-calculated SUCI that is acceptable to the home network for authentication purposes. This failure recovery process is described in more detail below with reference to FIG. 4. Another failure recovery process, represented by block 318, is to temporarily disable the 5G NR RAT at the UE 102, and thus force the UE 102 to detach from the 5G NR network, and then subsequently reattempt the 5G NR attachment procedure using the specified USIM-calculated SUCI approach in response to one or more trigger events, such as expiration of a timer or an OTA update. This failure recovery process is described in more detail below with reference to FIG. 5. Still further, another failure recovery process, represented by block 320, is to disable the 5G NR RAT at the UE 102 to force detachment from the 5G NR network and then fall back to use of a legacy RAT and RAN, such as by attempting to attach to a 4G LTE RAN via the 4G LTE RAT of the UE 102.

As noted, these failure recovery processes may be implemented singularly or in some sequential combination. For example, the UE 102 may be configured to first attempt the ME-calculated SUCI failure recovery process represented by block 316, and if that fails to complete authentication, then switch to the trigger-event-based USIM-calculated SUCI reattempt approach represented by block 318, and if that fails, then switch to the legacy RAN fallback approach represented by block 320. However, in some embodiments, the MNO or HPLMN may not wish to permit the UE 102 to utilize certain failure recovery processes. For example, for security reasons the MNO or HPLMN may seek to avoid use of a ME-calculated SUCI and thus may expressly configure the UE 102 to avoid use of the ME-calculated SUCI fallback approach represented by block 316, in which case the UE 102 would then rely on one or both of the failure recovery processes of blocks 318 and 320.

Figure 4:
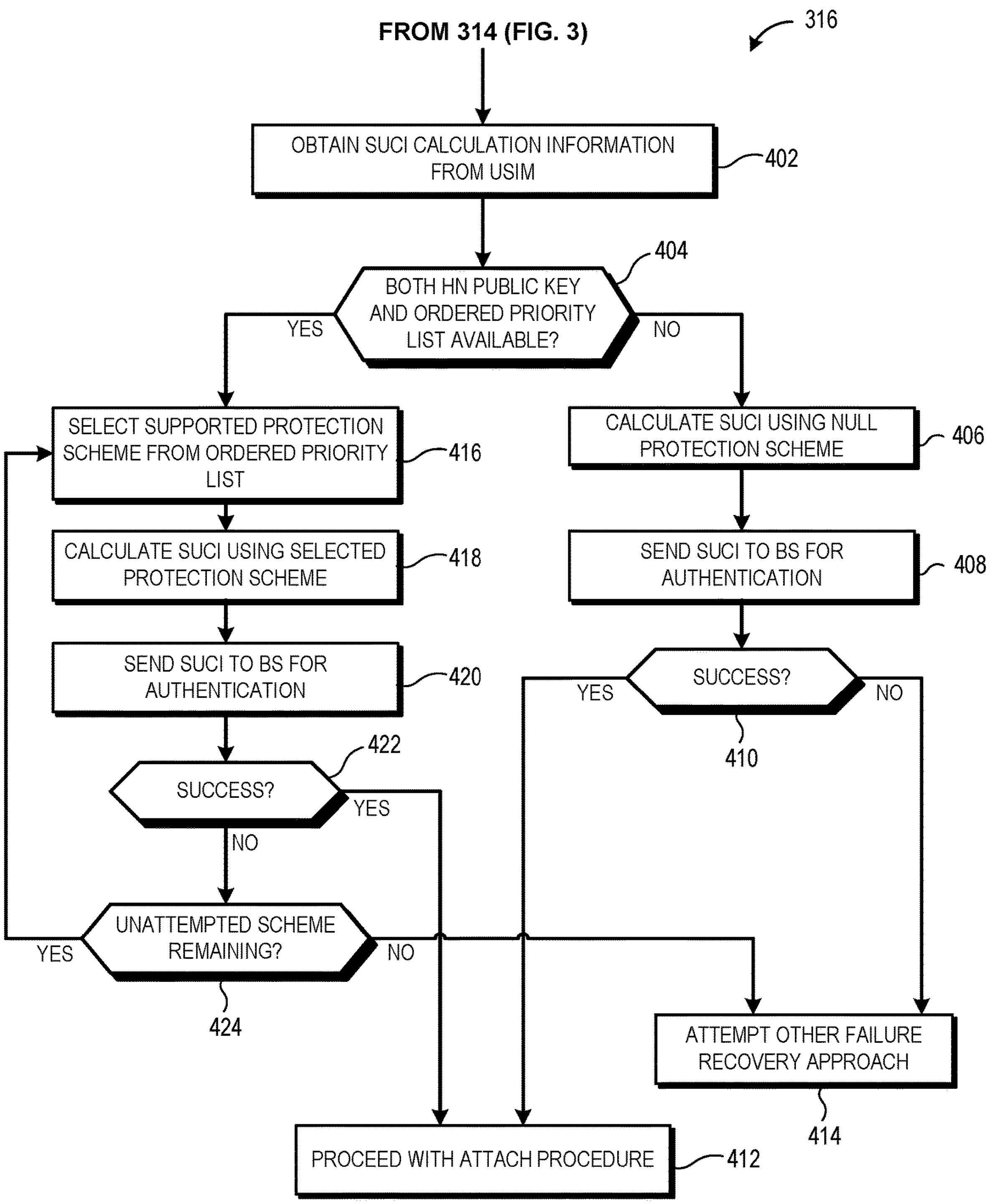
FIG. 4 is a flow diagram illustrating an example SUCI failure recovery process employing a fallback to a ME-generated SUCI in accordance with some embodiments.

FIG. 4 illustrates an example implementation of the ME-calculated SUCI failure recovery process represented by block 316 of the method 300 of FIG. 3 in accordance with some embodiments. As noted above, when failure in the USIM-calculated SUCI process is identified at block 314, the UE 102 can elect to recover from this failure by employing the aforementioned ME-calculated SUCI failure recovery process. In this approach, the ME component of the UE 102 attempts to calculate a suitable SUCI for authentication purposes. Accordingly, at block 402 the ME component obtains the SUCI calculation information 224 from the USIM 222 by, for example, performing a reading of the EFSUCI_Calc_Info to attempt to obtain the pertinent SUCI calculation parameters, including the ordered priority list 234 and the HN public key list 236.

One reason the USIM-generated SUCI process failed could be that one or both of the ordered priority list 234 or the HN public key list 236 were not provisioned or were erased or corrupted. Accordingly, prior to continuing with the attempt to generate a suitable ME-calculated SUCI, at block 404 the UE 102 first verifies that both the ordered priority list 234 and the HN public key list 236 are present in the accessed SUCI calculation information 224 and are valid. If either is missing or invalid, then at block 406 the UE 102 defaults to using the Null protection scheme to generate the ME-calculated SUCI. As noted above, in the Null protection scheme, encryption is not employed and thus either the SUPI or another identifier is provided in plaintext form as part of the resulting ME-calculated SUCI in place of a scheme output representing an encrypted version of the SUCI. At block 408, the UE 102 wirelessly transmits this ME-generated SUCI to the 5G NR network in response to the NAS identity request transmitted earlier from the 5G NR network. In the event that this ME-calculated SUCI is successfully accepted by the home network for authentication purposes (as determined at block 410), then at block 412 the UE 102 can continue with the 5G NR attach procedure at block 412. Otherwise, if it is determined at block 410 that the ME-calculated SUCI was not successful in authenticating the UE 102 with the home network, then the UE 102 ceases the ME-calculated failure recovery process and resorts to attempting a different failure recovery process at block 414, such as attempting the trigger-event-based failure recovery process of block 318 or the legacy RAN fallback approach of block 320.

Returning to block 404, in the event that the SUCI calculation information 224 contains both a valid ordered priority list 234 and a valid HN public key list 236, then the UE 102 can attempt to calculate a ME-calculated SUCI without utilizing the Null protection scheme. Accordingly, at block 416 the UE 102 accesses the ordered priority list 234 and selects the highest priority protection scheme represented therein (that has not already been selected in a prior iteration of block 416) that is also supported by the UE 102. At block 418, the UE 102 then uses the protection scheme selected at block 418, along with the corresponding HN public key from the HN public key list 236, to calculate a ME-generated SUCI based on the parameters of the selected protection scheme and the HN public key. At block 420, the UE 102 then wirelessly transmits the ME-calculated SUCI to the base station 106 in reply to the earlier-transmitted NAS identity request provided by the 5G NR network. At block 422, the UE 102 determines whether the provided ME-calculated SUCI was successfully authenticated by the home network. If so, then the UE 102 can proceed with the remainder of the attach procedure as described with reference to block 412.

If the UE 102 determines at block 422 that the ME-generated SUCI was not successful in authenticating the UE 102, then at block 424 the UE 102 determines whether there is another yet-untried protection scheme that could be used to generate a different ME-calculated SUCI. If so, then the method flow returns to block 416 for another iteration of the process of blocks 416, 418, 420, 422, and 424 for the next highest priority protection scheme in the ordered priority list 234 that is supported by the UE 102, and which has not yet been used in a previous iteration to generate a ME-calculated SUCI. Iterations of this process continue until either a ME-calculated SUCI from an iteration has been accepted for authentication purposes by the home network, or until the last supported protection scheme from the ordered priority list 234 has been used to generate a corresponding ME-calculated SUCI. If all such SUCI authentication attempts fail, then the UE 102 then can elect to attempt a different failure recovery process as described above with reference to block 414.

Figure 5:
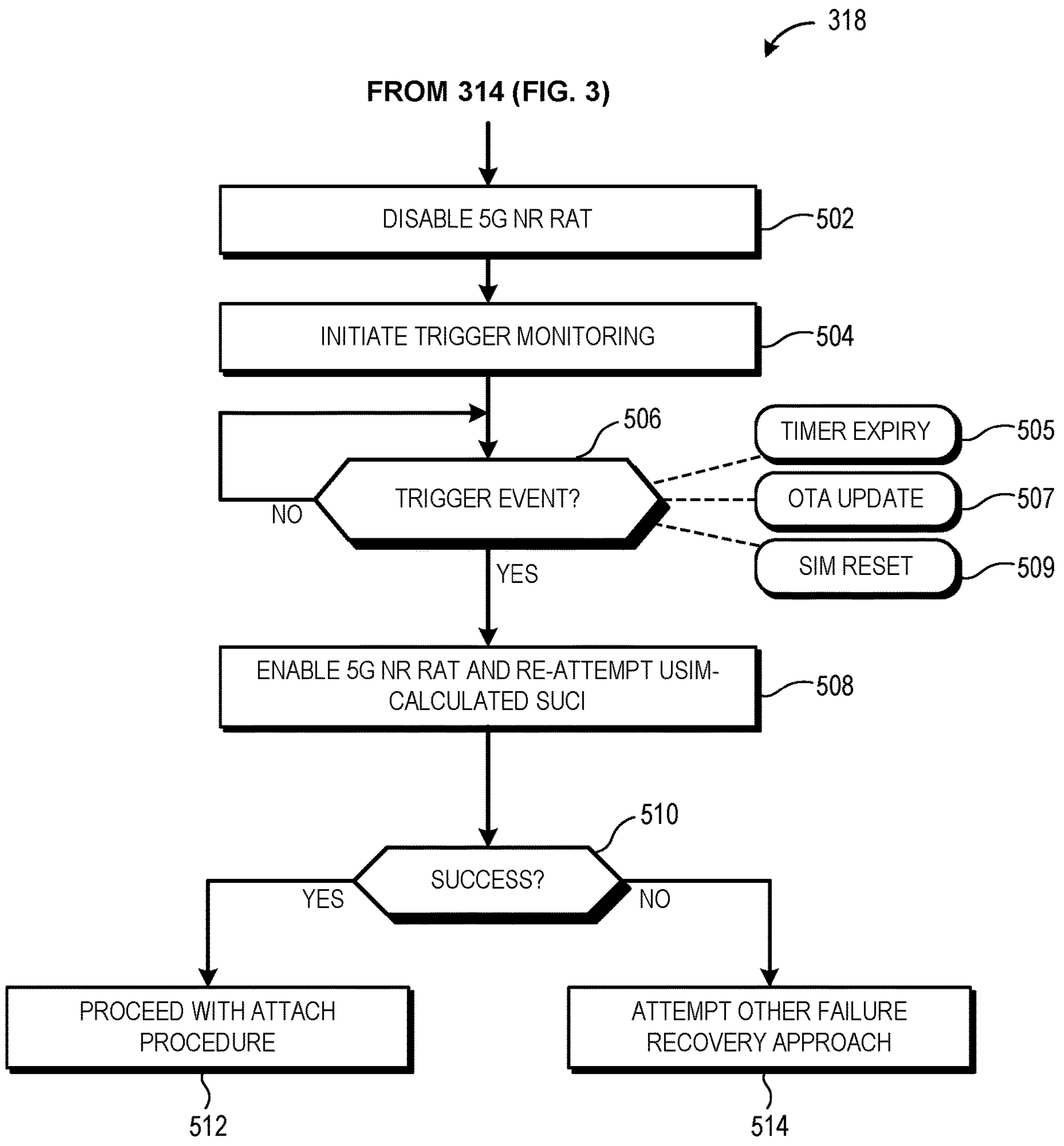
FIG. 5 is a flow diagram illustrating an example SUCI failure recovery process employing trigger-based attach reattempts in accordance with some embodiments.

FIG. 5 illustrates an example implementation of the trigger-event-based SUCI failure recovery process represented by block 318 of the method 300 of FIG. 3 in accordance with some embodiments. As noted above, when failure in the USIM-calculated SUCI process is identified at block 314, the UE 102 can elect to recover from this failure by employing the aforementioned trigger-event-based SUCI failure recovery process. In this approach, an initial action taken by the UE 102 is to disable the 5G NR RAT at block 502 to force the UE 102 to detach from the 5G NR network and thus avoid a situation in which the UE 102 is nominally attached but unable to access the services of the 5G NR network due to lack of authentication. Concurrently, at block 504 the UE 102 initiates trigger monitoring for one or more applicable trigger events used to trigger the UE 102 to subsequently reattempt the 5G NR attach process using a USIM-calculated SUCI. Generally, these triggers reflect an expectation that some change to the USIM 222 is to occur. For example, the failure of the USIM 222 to generate a USIM-calculated SUCI may simply be a result of a temporary situation of the USIM 222, such as a temperamental supply of power to the UICC 218 or a time out on the GET IDENTITY request due to the resources of the UICC 218 being used for a different process.

As such, one trigger that the UE 102 can employ is a timer with the corresponding trigger event being expiry of the timer (timer expiry 505), and thus when the UE 102 has disabled the 5G NR RAT at block 502, the UE 102 can then start the timer to await the timer expiry 505 as a trigger event. The duration of the timer can be set on any of a variety of factors or may be preselected.

Another cause of a USIM SUCI calculation failure may be the failure of an MNO or HPLMN to properly provision the SUCI calculation information 224 or for such information to become corrupted or accidentally overwritten after provisioning. In such cases, this may be subsequently remedied by the MNO or HPLMN via an over-the-air (OTA) update to the USIM 222 (often referred to as a "SIM OTA update") which either provisions the missing SUCI calculation information or overwrites bad information with updated information. As such, another trigger event that the UE 102 can employ is the receipt of an OTA update 507 for the USIM 222.

Similarly, SUCI calculation information may be temporarily corrupted or temporarily accessible to the USIM 222 due to a temporary situation, and which is resolved by a reset of the UICC 218 to restore the UICC 218 to its initialized state (and thus restore the USIM 222 and the stored data to their initialized state). Accordingly, a trigger event that the UE 102 can employ also can include a soft or hard reset of the USIM 222 (SIM reset 509).

At block 506, the UE 102 monitors for one or more specified trigger events. In response to detecting a trigger event, such as one or more of a timer expiry 505, an OTA update 507, or a SIM reset 509, at block 508 the UE 102 re-enables the 5G NR RAT and re-attempts the attach procedure described above and in which the USIM 222 is again directed to provide a USIM-calculated SUCI in response to a GET IDENTITY command from the UE 102. In the event that the USIM 222 succeeds in providing a USIM-calculated SUCI, as determined at block 510, then at block 512 the UE 102 continues with the attach procedure, including providing the USIM-calculated SUCI to the 5G NR network for authentication. Otherwise, if the UE 102 determines at block 510 that the USIM 222 is continuing to return an error in response to a GET IDENTITY command despite the passage of time, an OTA update, a SIM reset, or other trigger event detected by the UE 102, then at block 514 the UE 102 can turn to attempting to use a different SUCI failure recovery process, such as the ME-calculated SUCI failure recovery process represented by block 316 or the legacy RAN fallback approach of block 320.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method in a user equipment (UE), the method comprising:

responsive to a universal subscriber identity module (USIM) of the UE returning an error during an attempt to provide a USIM-calculated concealed identifier for the UE during an attach procedure to wirelessly connect the UE to a first network, implementing at least one failure recovery process to attempt to complete attachment of the UE to a network.

2. The method of claim 1, wherein the at least one failure recovery process includes a process of:

accessing concealed identifier calculation information from the USIM;

calculating at least one concealed identifier using the concealed identifier calculation information and without using the USIM; and providing the at least one concealed identifier for receipt by the first network for authentication of the UE.

3. The method of claim 2, wherein:

the concealed identifier calculation information comprises an ordered priority list of protection schemes available for use in calculating a concealed identifier from a unique identifier associated with the UE and a home network public key list of home network public keys associated with respective protection schemes of the ordered priority list; and calculating at least one concealed identifier and providing the at least one concealed identifier to the first network comprises:

selecting a protection scheme from the ordered priority list that has not yet been selected and which is supported by the UE;

calculating a concealed identifier using the selected protection scheme and a corresponding home network public key; and providing the calculated concealed identifier for receipt by the first network for authentication.

4. The method of claim 3, wherein calculating at least one concealed identifier and providing the at least one concealed identifier to the first network further comprises:

repeating the selection of a protection scheme from the ordered priority list that has not yet been selected and which is supported by the UE, the calculation of a concealed identifier using the selected protection scheme, and the provision of the calculated concealed identifier to the first network for authentication until one of: a provided calculated concealed identifier is authenticated by the first network or every protection scheme of the ordered priority list that is supported by the UE has been selected and used for calculation of a corresponding concealed identifier.

5. The method of claim 4, further comprising:

responsive to every protection scheme of the ordered priority list that is supported by the UE having been selected and used for calculation of a corresponding concealed identifier without being authenticated by the network, implementing a different failure recovery process to attempt to complete attachment of the UE to a network.

6. The method of claim 5, wherein the different failure recovery process comprises a process of:

disabling a first radio access technology (RAT) of the UE used to communicate with the first network; and switching to a second RAT of the UE to attempt to attach to a second network.

7. The method of claim 6, wherein the first RAT is a Fifth Generation New Radio (5G NR) RAT and the second RAT is a Fourth Generation Long Term Evolution (LTE) RAT.

8. The method of claim 5, wherein the at least one failure recovery process includes a process of:

disabling a radio access technology (RAT) of the UE used to communicate with the first network;

monitoring for at least one trigger event; and responsive to detecting a trigger event:

enabling the RAT; and attempting to obtain a USIM-calculated concealed identifier from the USIM for another attempt to complete attachment of the UE to the first network.

9. The method of claim 1, wherein the at least one failure recovery process includes a process of:

disabling a radio access technology (RAT) of the UE used to communicate with the first network;

monitoring for at least one trigger event; and responsive to detecting a trigger event:

enabling the RAT; and attempting to obtain a USIM-calculated concealed identifier from the USIM for another attempt to complete attachment of the UE to the first network.

10. The method of claim 9, wherein the at least one trigger event comprises at least one of: expiry of a timer, an over-the-air (OTA) update of the USIM, or a reset of the USIM.

11. The method of claim 1, wherein the USIM-calculated concealed identifier comprises a subscription concealed identifier (SUCI).

12. A user equipment (UE) comprising:

a radio frequency (RF) interface configured to communicate with at least a first network;

a universal integrated circuit card (UICC) implementing a universal subscriber identity module (USIM);

at least one processor coupled to the RF interface and the UICC; and at least one memory coupled to the at least one processor, the at least one memory storing instructions configured to manipulate the at least one processor to:

responsive to a universal subscriber identity module (USIM) of the UE returning an error during an attempt to provide a USIM-calculated concealed identifier for the UE during an attach procedure to wirelessly connect the UE to a first network, implement at least one failure recovery process to attempt to complete attachment of the UE to a network.

13. The UE of claim 12, wherein the at least one failure recovery process includes a process of:

accessing concealed identifier calculation information from the USIM;

calculating at least one concealed identifier using the concealed identifier calculation information and without using the USIM; and providing the at least one concealed identifier for receipt by the first network for authentication of the UE.

14. The UE of claim 13, wherein:

the concealed identifier calculation information comprises an ordered priority list of protection schemes available for use in calculating a concealed identifier from a unique identifier associated with the UE and a home network public key list of home network public keys associated with respective protection schemes of the ordered priority list; and calculating at least one concealed identifier and providing the at least one concealed identifier to the first network comprises:

selecting a protection scheme from the ordered priority list that has not yet been selected and which is supported by the UE;

calculating a concealed identifier using the selected protection scheme and a corresponding home network public key; and providing the calculated concealed identifier for receipt by the first network for authentication.

15. The UE of claim 14, wherein calculating at least one concealed identifier and providing the at least one concealed identifier to the first network further comprises:

repeating the selection of a protection scheme from the ordered priority list that has not yet been selected and which is supported by the UE, the calculation of a concealed identifier using the selected protection scheme, and the provision of the calculated concealed identifier to the first network for authentication until one of: a provided calculated concealed identifier is authenticated by the first network or every protection scheme of the ordered priority list that is supported by the UE has been selected and used for calculation of a corresponding concealed identifier.

16. The UE of claim 15, wherein the instructions further are to manipulate the at least one processor to:

responsive to every protection scheme of the ordered priority list that is supported by the UE having been selected and used for calculation of a corresponding concealed identifier without being authenticated by the network, implement a different failure recovery process to attempt to complete attachment of the UE to a network.

17. The UE of claim 16, wherein the different failure recovery process comprises a process of:

disabling a first radio access technology (RAT) of the UE used to communicate with the first network; and switching to a second RAT of the UE to attempt to attach to a second network.

18. The UE of claim 16, wherein the at least one failure recovery process includes a process of:

disabling a radio access technology (RAT) of the UE used to communicate with the first network;

monitoring for at least one trigger event; and responsive to detecting a trigger event:

enabling the RAT; and attempting to obtain a USIM-calculated concealed identifier from the USIM for another attempt to complete attachment of the UE to the first network.

19. The UE of claim 12, wherein the at least one failure recovery process includes a process of:

disabling a radio access technology (RAT) of the UE used to communicate with the first network;

monitoring for at least one trigger event, wherein the at least one trigger event comprises at least one of: expiry of a timer, an over-the-air (OTA) update of the USIM, or a reset of the USIM; and responsive to detecting a trigger event:

enabling the RAT; and attempting to obtain a USIM-calculated concealed identifier from the USIM for another attempt to complete attachment of the UE to the first network.

20. The UE of claim 12, wherein the USIM-calculated concealed identifier comprises a subscription concealed identifier (SUCI).

* * * * *